(12) United States Patent
Sajjan et al.

(10) Patent No.: US 11,937,170 B2
(45) Date of Patent: Mar. 19, 2024

(54) MANAGING MUTUALLY EXCLUSIVE ACCESS TO NETWORK SLICES

(71) Applicant: Hewlett Packard Enterprise Development LP, Houston, TX (US)

(72) Inventors: Aruna Sajjan, Karnataka (IN); Ramya Nagarajan, Karnataka (IN); Balakrishna Thupakula, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 6 days.

(21) Appl. No.: 17/492,566

(22) Filed: Oct. 2, 2021

(65) Prior Publication Data

US 2023/0022184 A1 Jan. 26, 2023

(30) Foreign Application Priority Data

Jul. 14, 2021 (IN) .............................. 202141031751

(51) Int. Cl.
*H04W 48/02* (2009.01)
*H04L 67/141* (2022.01)

(52) U.S. Cl.
CPC ........... *H04W 48/02* (2013.01); *H04L 67/141* (2013.01)

(58) Field of Classification Search
None
See application file for complete search history.

(56) References Cited

U.S. PATENT DOCUMENTS

| 10,070,344 | B1 * | 9/2018 | Dowlatkhah | ......... | H04W 28/16 |
| 11,012,872 | B1 * | 5/2021 | Bellamkonda | ...... | H04L 41/0823 |
| 2020/0008139 | A1 * | 1/2020 | Lai | ........................ | H04W 48/16 |
| 2020/0053643 | A1 * | 2/2020 | Lee | ...................... | H04W 8/205 |
| 2020/0196315 | A1 * | 6/2020 | Young | ................... | H04W 72/53 |
| 2020/0295970 | A1 * | 9/2020 | Gurbani | ................ | G06N 20/00 |

(Continued)

FOREIGN PATENT DOCUMENTS

| CN | 110677884 A | 1/2020 |
| WO | 2019/245921 A1 | 12/2019 |

OTHER PUBLICATIONS

Shariat, M. et al., "A Flexible Network Architecture for 5G Systems," Wireless Communications and Mobile Computing, Feb. 11, 2019, vol. 2019, Article ID 5264012, 20 pages.

(Continued)

*Primary Examiner* — Gregory B Sefcheck
(74) *Attorney, Agent, or Firm* — Hewlett Packard Enterprise Patent Department

(57) ABSTRACT

Examples relate to managing mutually exclusive access to network slices in a communications network. A unified data management (UDM) node implementing a UDM network function of the communications network receives, from a session management function (SMF) node, a session registration request for accessing a first network slice to which a user equipment (UE) seeks access. Responsive to receiving the session registration request, the UDM node determines whether the UE has an active session registration for a second network slice, The UDM further selectively rejects the session registration request for accessing the first network slice based on a policy in response to determining that the UE has the active session registration for the second network slice.

14 Claims, 5 Drawing Sheets

(56) References Cited

U.S. PATENT DOCUMENTS

| | | | | |
|---|---|---|---|---|
| 2021/0014781 A1* | 1/2021 | Ianev | ................... | H04W 48/18 |
| 2021/0084523 A1* | 3/2021 | Kucera | ................ | H04W 28/06 |
| 2021/0144790 A1* | 5/2021 | Faccin | ................. | H04W 60/00 |
| 2021/0250854 A1* | 8/2021 | Olvera-Hernandez | ...................... | H04W 48/16 |
| 2021/0337465 A1* | 10/2021 | Hedman | ............... | H04W 48/16 |
| 2021/0351925 A1* | 11/2021 | Deng | ................ | H04W 12/0433 |
| 2021/0385777 A1* | 12/2021 | Son | ........................ | H04W 8/18 |
| 2022/0070157 A1* | 3/2022 | Ben Henda | ............. | H04L 63/20 |
| 2022/0078590 A1* | 3/2022 | Gundavelli | ........... | H04W 48/18 |
| 2022/0078696 A1* | 3/2022 | Saxena | ................. | H04W 12/69 |
| 2022/0272620 A1* | 8/2022 | Ninglekhu | ............. | H04W 88/02 |
| 2022/0303934 A1* | 9/2022 | Ianev | ................. | H04W 60/005 |
| 2022/0312478 A1* | 9/2022 | Kuang | ............... | H04W 74/0833 |
| 2022/0338151 A1* | 10/2022 | Tang | .................... | H04W 48/18 |
| 2022/0360580 A1* | 11/2022 | Mishra | ................ | H04W 12/009 |
| 2023/0052699 A1* | 2/2023 | Ninglekhu | ............. | H04W 48/16 |

OTHER PUBLICATIONS

Shurman, M. et al., "Slice Selection In 5G Networks: Novel Approach for Accessing Multiple Slices Simultaneously", 11th International Conference on Information and Communication Systems (ICICS), Apr. 2020, 5 pages.

\* cited by examiner

MANAGING MUTUALLY EXCLUSIVE ACCESS TO NETWORK SLICES

BACKGROUND

In a 5$^{th}$ generation (5G) cellular network, network slices may be deployed. Network slicing may refer to a networking architecture that enables partitioning of physical network infrastructures into virtual elements. In particular, the network slicing may allow the creation of multiple logical networks (e.g., network slices) on a common physical network infrastructure. Each network slice may be an isolated network that includes dedicated and/or shared resources for a specific use case.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

DETAILED DESCRIPTION OF SPECIFIC EXAMPLES

Figure 1:
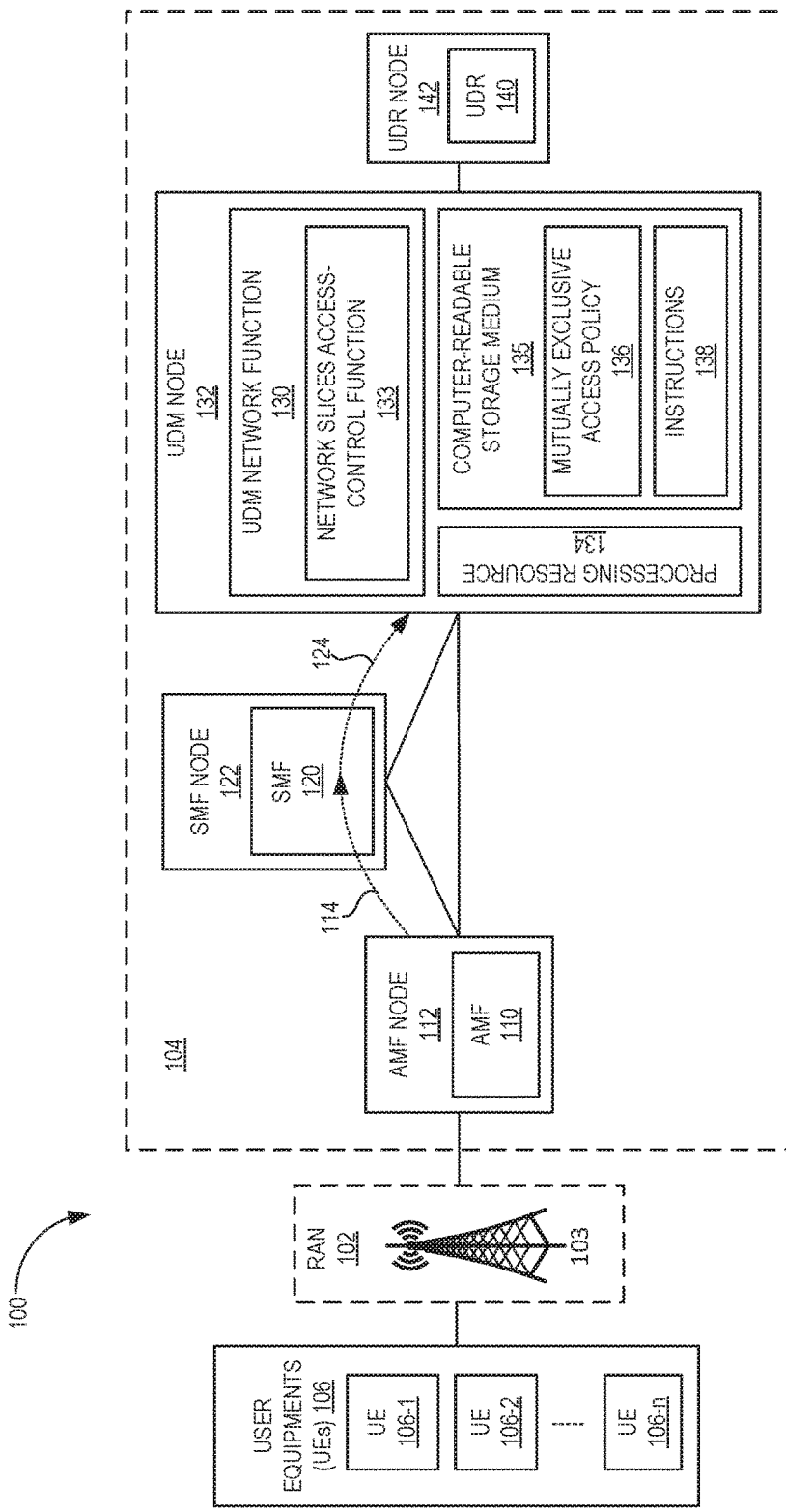
FIG. 1 is a block diagram of a communications network including a unified data management (UDM) node for managing mutually exclusive access to network slices for a user equipment (UE), in accordance with an example.

As described above, a 5G cellular network can include multiple network slices. In some examples, each network slice may support a particular use case or operate as a separate network on which services may be delivered to a subset of devices (e.g., connected vehicles, smartphones, industrial equipment, and/or any device capable of accessing the network). In an illustrative example, a 5G cellular network may provide personal phone services via a first network slice, critical services (e.g., public safety) via a second network slice, and Internet of Things (IoT) services (e.g., sensors, machines, etc.) via a third network slice.

Unlike public communications networks, a private or non-public communications network using 5G technology may provide/enable organizations with improved customization and control of their own connectivity. For example, private institutions such as colleges, large manufacturing facilities, hospitals, and the like may deploy their own 5G network. In a non-public communications networks, network resources and services associated with one or more network slices may be provided in accordance with one or more policies. In an example, these policies may be configurable and custom tailored to support security or other operational requirements. For example, in a manufacturing facility, access to a network slice configured for the maintenance of industrial equipment may be restricted while accessing another network slice configured for the monitoring/controlling industrial equipment in a particular area of operation.

In some examples, a device may be restricted to access a threshold number of network slices simultaneously, which may be referred to as mutually exclusive access to network slices. Available approaches for controlling the mutually exclusive access to network slices may include providing or indicating, to a given device, what network slices the given device is allowed or restricted to access simultaneously. However, these approaches may cause network security vulnerabilities and may be prone to network tampering or other malicious or unauthorized activity.

The systems and methods disclosed herein are directed to a secure and simple approach for managing mutually exclusive access to network slices in a 5G communications network. In particular, the systems and methods described herein may enable the management of the mutually exclusive access to network slices by a unified data management (UDM) network function of the 5G communications network. The UDM network function is a network function in a core network of the 5G communications network within the control of an operator of the 5G communications network. The UDM network function tracks subscription data of users via-a-vis devices (e.g., smartphones, tablets, etc.) and manages requests (i.e., access requests), from a users' device to access the network slices. In addition to managing the access requests, the examples described herein may enable the UDM network function to manage the mutually exclusive access to network slices. In this manner, the systems and methods described herein may enable a single network function such as the UDM network function, to provide the overall management of accessing network slices in the 5G communications network.

In some examples, a unified data management (UDM) node implementing a UDM network function of a 5G communications network may receive, from a session management function (SMF) node, a session registration request for accessing a first network slice to which a user equipment (UE) seeks access. The SMF node may implement an SMF of a 5G communications network. In response to receiving the session registration request, the UDM node may determine that a network slice access-control function is applied on the UE. The network slice access-control function may define a policy for accessing the first network slice. In response to determining that the network slice access-control function is applied on the UE, the UDM node may determine whether the UE has an active session registration for a second network slice. In response to determining that the UE has the active session registration for the second network slice, the UDM node may selectively reject the session registration request for accessing the first network slice based on the defined policy.

The systems and methods of the present subject matter are further described with reference to FIGS. 1-4. It should be noted that the description and figures merely illustrate the principles of the present subject matter along with examples described herein and should not be construed as a limitation to the present subject matter. It is thus understood that various arrangements may be devised that, although not explicitly described or shown herein, embody the principles of the present subject matter. Although some examples may be described herein with reference to two network slices, examples may be utilized for more than two network slices. Furthermore, any functionality described herein as performed by a component (e.g., user equipment) or a network function (e.g., an SMF and a UDM) in a communications network may be performed by at least one processing resource executing instructions (stored on a computer-readable storage medium) to perform the functionalities described herein. Various implementations of the present subject matter have been described below by referring to several examples.

For the convenience of explanation, the disclosure herein uses terms and names defined in standards (e.g., the $3^{rd}$ Generation Partnership Project (3GPP) specifications) for a 5G communications network. However, the disclosure is not limited to these terms and names.

FIG. 1 is a block diagram illustrating a network environment 100 for implementing the examples described herein. In one example, the network environment 100 may include at least some components of a 5G communications network. The network environment 100 may enable multiple wireless users to share resources, including wireless bandwidth, and otherwise access content including but not limited to voice, data, video, messaging, broadcast, etc.

In the examples described herein, the network environment 100 may be a stand-alone non-public network (SNPN) for non-public use. Examples of the SNPN may be a manufacturing site, an institution, an enterprise, and the like. The SNPN may be operated by an operator (e.g., service provider or network operator) and may not rely on network functions provided by a Public Land Mobile Network (PLMN) in accordance with 3GPP specifications. The SNPN can be identified by a combination of a PLMN identifier (PLMN ID) and a network identifier (NID).

Each UE 106 in the network environment 100 may be uniquely identified, located, and tracked by a Subscription Permanent Identifier (SUPI) or concealed SUPI (generally, referred to as Subscription Concealed Identifier (SUCI)) allocated to a SIM card of the UE 106.

The network environment 100 may include at least two component networks: a radio access network (RAN) 102 and a core network 104. The RAN 102 may allow the users to connect to the core network 104 via mobile devices (also referred to herein as user equipment (UE)) 106-1, 106-2, . . . 106-n (collectively referred to as "UEs 106"). Examples of the UEs 106 may include smartphones, tablet computers, laptops, vehicle-implemented communication devices, and the like.

The RAN 102 may include radio network resources such as a cell tower 103 that maintains network signal strength across large and small distances. In some examples, the cell tower 103 may include a network node such as Node B, eNodeB, gNB or the like. In example FIG. 1, a gNB 103 is illustrated. The cell tower 103 may include multiple-input multiple-output (MIMO) antennas that transmit wireless signals to, and/or receive wireless signals from, the UEs 106. Although FIG. 1 shows a single cell tower 103 for simplicity, the RAN 102 may include any number of cell towers, base stations, other radio network resources such as masts, in-home/in-building resources, and the like.

The core network 104 may include a mobile exchange and data network for managing the connections made via the RAN 102. In some examples, the core network 104 may leverage network function virtualization (instantiation of network functions (NFs) using virtual machines via the cloud) and network slicing in accordance with a particular application, industry, or other criteria to provide improved response times and fast connectivity. As described above, network slicing may be used to customize support for the UEs 106 based on types of services being utilized. In an example, a plurality of network slices may be established in the network environment 100 for different use cases. Example use cases may include services relying on connected vehicles, services relying on Internet on Things (IoT), services for mobile broadbands, and/or the like. According to the manner in which the plurality of network slices are established in the network environment 100, a given UE 106 can request to connect to multiple network slices, e.g., up to eight network slices simultaneously.

The core network 104 may include certain network functions (NFs), including, for example, a core access and mobility management function (AMF) 110, a session management function (SMF) 120, and a unified data management (UDM) network function 130. Other example core networks may include a network repository function (NRF), network slice selection function (NSSF), authentication server function (AUSF), and/or any number of other network functions for servicing the core network. Although one of each network function is shown for illustrative purposes, any number and any combination of network functions may be implemented in core network 104. Further, the NFs, as described herein, may be implemented in a single node or distributed nodes to perform their functionalities, in some examples.

As used herein, the term "node" may refer to one or more computing devices configured to emulate one or more, or all, of the functions described herein. As used herein, a "computing device" may be a server, a cluster of servers, a storage array, a computer appliance, a workstation, a desktop computer, a laptop computer, a switch, a router, or any other processing device or equipment including a processing resource. In an example, the node may include a processing resource (e.g., processing resource 134) communicatively coupled to at least one non-transitory computer-readable storage medium (e.g., computer-readable storage medium 135) including instructions that, when executed by the processing resource, cause the node to undertake certain actions and functionalities as described herein.

In the examples described herein, the processing resource may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution of instructions stored on a computer-readable storage medium, or a combination thereof. In the examples described herein, the processing resource may fetch, decode, and execute instructions stored on a storage medium to perform the functionalities described in relation to the instructions stored on the computer-readable medium. In other examples, the functionalities described in relation to any instructions described herein may be implemented in the form of electronic circuitry, in the form of executable instructions encoded on a computer-readable medium, or a combination thereof. The computer-readable storage medium may be located either in the computing device executing the instructions, or remote from but accessible to the computing device (e.g., via a computer network) for execution. In the examples illustrated herein, the node may be implemented by one computer-readable storage medium or multiple computer-readable storage media.

As used herein, a "computer-readable storage medium" may be any electronic, magnetic, optical, or other physical storage apparatus to contain or store information such as executable instructions, data, and the like. For example, any computer-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any computer-readable storage medium described herein may be non-transitory.

In the examples illustrated in FIG. 1, the core network 104 may include an AMF node 112 implementing the AMF 110, an SMF node 122 implementing the SMF 120, and a UDM node 132 implementing the UDM network function 130. Although FIG. 1 shows separate nodes (i.e., the AMF node 112 and the SMF node 122) for implementing the AMF 110 and SMF 120, the AMF 110 and SMF 120 may be implemented on a single node, in some examples.

The AMF node 112 may be connected to the cell tower 103 in the RAN 102. The AMF 110 implemented on the AMF node 112 may handle connection and mobility management tasks for the UEs 106. For example, the AMF 110 may be responsible for authenticating the UEs 106 for accessing one or more of the plurality of network slices (e.g., handling protocol data unit (PDU) session establishment requests), forwarding session management messages (e.g., non-access stratum (NAS) message, N2 message), mobility management, and the like.

In some examples, the SMF node 122 may be connected to the AMF node 112. The SMF 120 implemented on the SMF node 122 may configure the routing of traffic in the network environment 100. In some examples, the SMF 120 may perform functions, such as managing and allocating IP addresses to the UEs 106, managing PDU session establishment requests for the UEs 106, controlling policy enforcement and quality of service (QoS), providing downlink data notifications, and the like.

The UDM node 132 may be connected to the AMF node 112 and the SMF node 122. In some examples, the UDM network function 130 implemented on the UDM node 132 may manage users' data. The users' data may refer to data such as subscription data (e.g., SUPI and SUCI), authentication information, and encryption keys for the information for user registration, access authentication, and network profiles for the UEs 106 that belong to the users. In particular, the UDM network function 130 may generate authentication credentials and authorize access to a given network slice, for a given UE 106, based on the subscription data. In an example, the UDM network function 130 may store the users' data in a unified data repository (UDR) 140. As illustrated, the UDR 140 may be implemented in a UDR node 142. In some other examples, the UDR 140 may be implemented in the UDM node 132. In addition to the users' data, the UDR 140 may include other data such as application data, exposure data, subscription policy data, and the like.

In some examples, the functionalities of the UDM network function 130 may be extended to further include a network slices access-control function 133 for managing the mutually exclusive access to network slices in the network environment 100. The network slices access-control function 133 may control a given UE 106 to access two or more network slices of the plurality of network slices simultaneously. In certain examples, the network slices access-control function 133 may restrict the UE(s) 106 to access the mutually exclusive network slices simultaneously even though the given UE 106 has a subscription for those mutually exclusive network slices. In the examples described herein, the network slices access-control function 133 may be associated with a policy 136 (referred to herein as "mutually exclusive access policy 136") for managing the mutually exclusive access to network slices. In an example, a network operator may define the network slices access-control function 133 within the UDM node 132 and store and/or configure the mutually exclusive access policy 136 in a computer-readable storage medium 135 of the UDM node 132. The network operator may define the network slices access-control function 133 as part of subscription settings such as system-level settings or subscriber-level settings. In some examples, the subscriber-level settings may be preferred over the system-level settings.

The functionalities of the UDM node 132 for managing the mutually exclusive access to network slices in the network environment 100 may be performed by a processing resource 134 of the UDM node 132 based on the mutually exclusive access policy 136 and the instructions 138 stored in the computer-readable storage medium 135. Based on the subscription settings, the UDM node 132 may apply the network slices access-control function 133 on the UE(s) 106 when the UE(s) 106 seeks access to a given network slice of the plurality of network slices. The network slices access-control function 133 may be applied to all requests to access the network slices, resulting in allowing some requests to access some of the network slices, while rejecting some other requests to access some other of the network slices.

In an example, the mutually exclusive access policy 136 may include information related to restrictions for the UE(s) 106 to access certain network slices in certain scenarios. In some examples, the mutually exclusive access policy 136 may include a first policy that specifies restricted network slice(s) corresponding to one or more network slices. The restricted network slice(s) specified for a given network slice may represent network slice(s) that cannot be accessed by a given UE 106 when the given UE 106 accesses the given network slice. Accordingly, the given network slice and the corresponding restricted slices are said to be mutually exclusive network slices. In an example, the first policy may include a first list of mutually exclusive network slices. Table 1 shows an example first list of mutually exclusive network slices. Table 1 includes restricted network slices for network slices: Slices A, Slice B, and Slice D in an example SNPN (identified by PLMN+NID). In Table 1, Slice A, Slice B, and Slice D are mutually exclusive network slices. Accordingly, access to at least two of Slice A, Slice B, and Slice D, simultaneously, is restricted.

TABLE 1

Example First List of Mutually Exclusive Network Slices

| PLMN + NID | Network Slice | Restricted network slice(s) |
|---|---|---|
| 333 + 021 + HPE | Slice A | Slice B, Slice D |
| 333 + 021 + HPE | Slice B | Slice A, Slice D |
| 333 + 021 + HPE | Slice D | Slice A, Slice B |

In some examples, the mutually exclusive access policy 136 may include a second policy that specifies access to a certain network slice (referred to herein as primary network slice) for a particular time period. For example, in a manufacturing facility, a network slice related to maintenance activities is allowed to be accessed in the evening hours (e.g., between 5 pm and 9 pm). In some examples, the second policy may include a second list of primary network slices. Table 2 shows an example second list of primary network slices that includes primary network slices and certain time periods for accessing the primary network slices in the example SNPN. In Table 2, Slice A is the primary network slice from 7 am to 5 pm (7 am-5 pm), Slice B is the primary network slice from 5 pm to 9 pm (5 pm-9 pm) and Slice D is the primary network slice from 9 pm to 7 am (9 pm-7 am). Accordingly, Slice A can be accessed from 7 am to 5 pm, Slice B can be accessed from 5 pm to 9 pm and Slice D can be accessed from 9 pm to 7 am. In some examples, the example second list of primary network slices may further include restricted network slices for each primary network slice.

TABLE 2

Example Second List of Primary Network Slices

| PLMN + NID | Time Period | Primary Network Slice |
|---|---|---|
| 333 + 021 + HPE | 7 am-5 pm | Slice A |
| 333 + 021 + HPE | 5 pm-9 pm | Slice B |
| 333 + 021 + HPE | 9 pm-7 am | Slice D |

In some examples, the second policy may specify access to a given primary network slice for a particular time period and restrict access to another network slice during that time period.

In some examples, the mutually exclusive access policy 136 may include a third policy that specifies access to the network slices based on priority values for the network slices. A priority value may be indicative of a level of priority for accessing a given network slice. In some examples, the mutually exclusive access policy 136 may allow access to a network slice having a low priority value and restrict access to another network slice having a high priority value. In some examples, the third policy may include a third list of network slices with priority values. For example, Table 3 shows an example third list of network slices with priority values in the example SNPN. As shown in Table 3, Slice A has a priority value lower than the priority values of Slice B and Slice D. Accordingly, access to Slice A may be allowed as Slice A has the lower priority value as compared to the priority values of Slice B and Slice D. In such instances, if a given UE 106 seeks access to Slice A while accessing Slice B, Slice B will be disconnected and access to Slice A will be allowed after disconnecting Slice B.

TABLE 3

Example Third List of Network Slices with Priority Values

| PLMN + NID | Priority Value | Network Slice |
|---|---|---|
| 333 + 021 + HPE | 1 | Slice A |
| 333 + 021 + HPE | 2 | Slice B |
| 333 + 021 + HPE | 5 | Slice D |

In order to receive a service in the network environment 100, a given UE 106 (e.g., the UE 106-1) may obtain authorization to allow mobility tracking and data reception. To this end, the AMF 110 may register the UE 106-1 in the network environment 100 via a registration procedure.

Once the UE 106-1 is registered, the UE 106-1 may initiate a protocol data unit (PDU) session establishment process to access a network slice of the plurality of network slices in the network environment 100. A PDU session may refer to a logical connection between a device (e.g., the UE 106-1) and a data network. The PDU session may be associated to a certain network slice. A PDU session establishment corresponding to the PDU session may allow data transmission in the network slice associated to the PDU session. In an example, the device may request for multiple PDU sessions associated to different network slices. In an example, the UE 106-1 may initiate a first PDU session establishment process to access a first network slice of the network environment 100. The first PDU session establishment process may be initiated by transmitting a non-access stratum (NAS) message containing a first PDU session establishment request. In some examples, The NAS message may include a single-network slice selection assistance information (S-NSSAI) for the first network slice, a PDU session identification (referred to herein as 'first PDU session ID') of the first PDU session establishment request, and a request type. As used herein, the term "S-NSSAI" is an identifier for a network slice in a 5G communications network. The request type may indicate an initial request or an existing request as described in the 3GPP specifications. The NAS message sent by the UE 106-1 may be encapsulated by the RAN 102 in an N2 message towards the AMF node 112. The N2 message may further include location information (i.e., user location information) of the UE 106-1.

The AMF node 112 may receive, from the RAN 102, the N2 message including the NAS message and the user location information. The AMF node 112 may determine that the NAS message corresponds to the first PDU session establishment request based on the request type and the S-NSSAI of the first network slice. The AMF node 112 may forward the first PDU session establishment request (indicated by dotted arrow 114) to the SMF node 122 as described in the 3GPP specifications. In an example, the AMF node 112 may forward the first PDU session establishment request along with the SUPI, S-NSSAI of the first network slice, the first PDU session ID, an AMF ID of the AMF node 112, the user location information, identification (PLMN ID and NID) of the network, etc.

In response to receiving the first PDU session establishment request from the AMF node 112, the SMF node 122 may send a session registration request (referred to herein as a first SMF session registration request and indicated by dotted arrow 124) including the first PDU session establishment request. The first SMF session registration request may further include the SUPI, the S-NSSAI of the first network slice, the PLMN ID and NID, the first PDU session ID, and the user location information along with an SMF ID of the SMF node 122. The SMF node 122 may send the first SMF session registration request to the UDM node 132 to verify the first PDU session establishment request.

In response to receiving the first SMF session registration request, the UDM node 132 may retrieve the subscription data for the UE 106-1 from the UDR 140. The subscription data for the UE 106-1 may be retrieved using the SUPI. Once the UDM node 132 retrieves the subscription data for the UE 106-1 successfully, the UDM node 132 may perform several functionalities for managing the mutually exclusive access to network slices in the network environment 100. In the examples described herein, the UDM node 132 may determine whether the UE 106-1 can access the first network slice based on the mutually exclusive access policy 136 in order to manage the mutually exclusive access to network slices. In an example, the functionalities performed by the UDM node 132 may be performed by the processing resource 134 executing the instructions 138 stored in the computer-readable storage medium (e.g., a non-transitory computer-readable storage medium) 135. The functionalities performed by the UDM node 132 for managing the mutually exclusive access to network slices are described below with the help of the flowcharts of FIGS. 2, 3, and 4.

Figure 2:
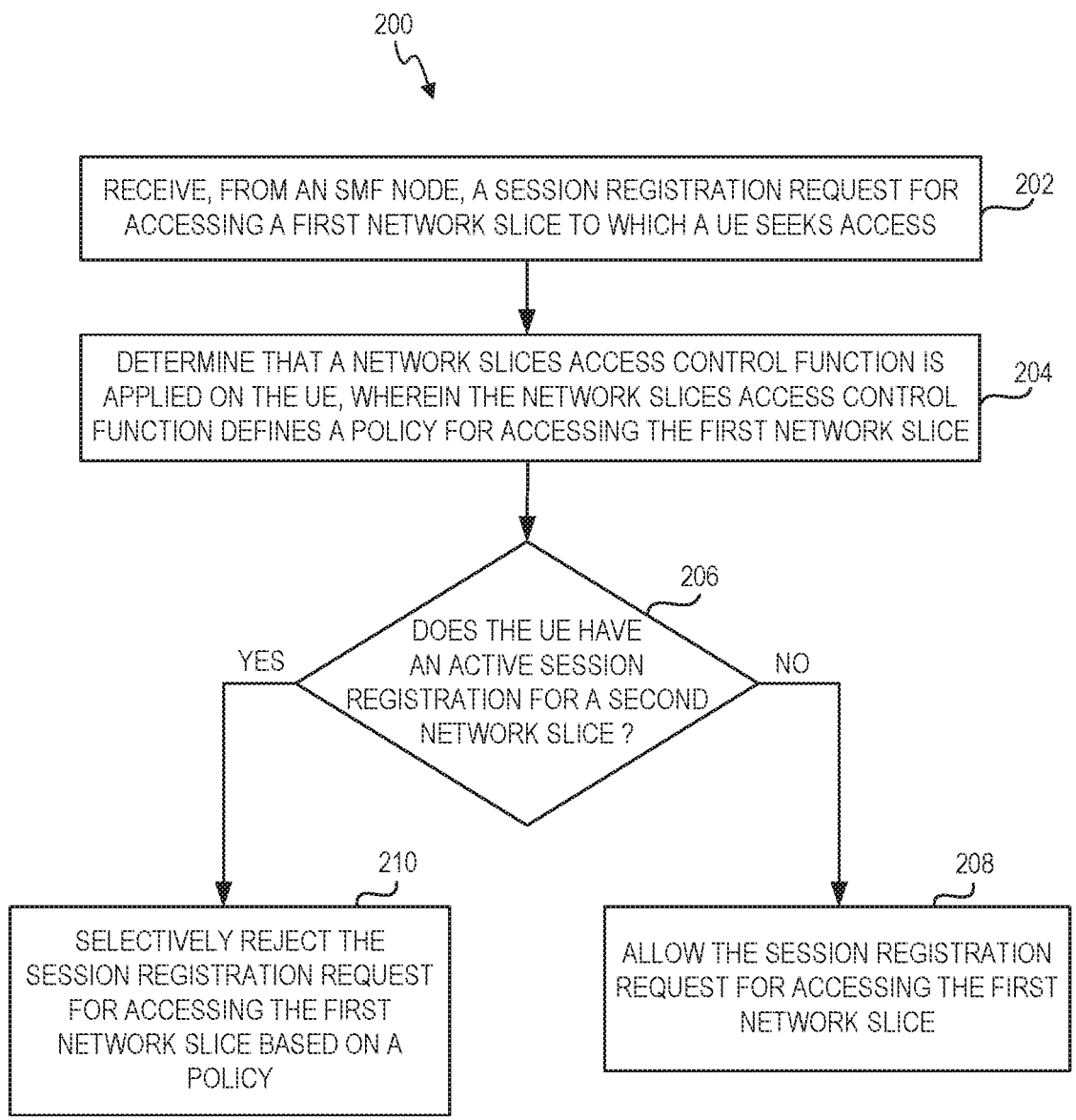
FIG. 2 is a flowchart of a method for managing mutually exclusive access to network slices for a UE in a communications network, in accordance with an example.
Figure 3:
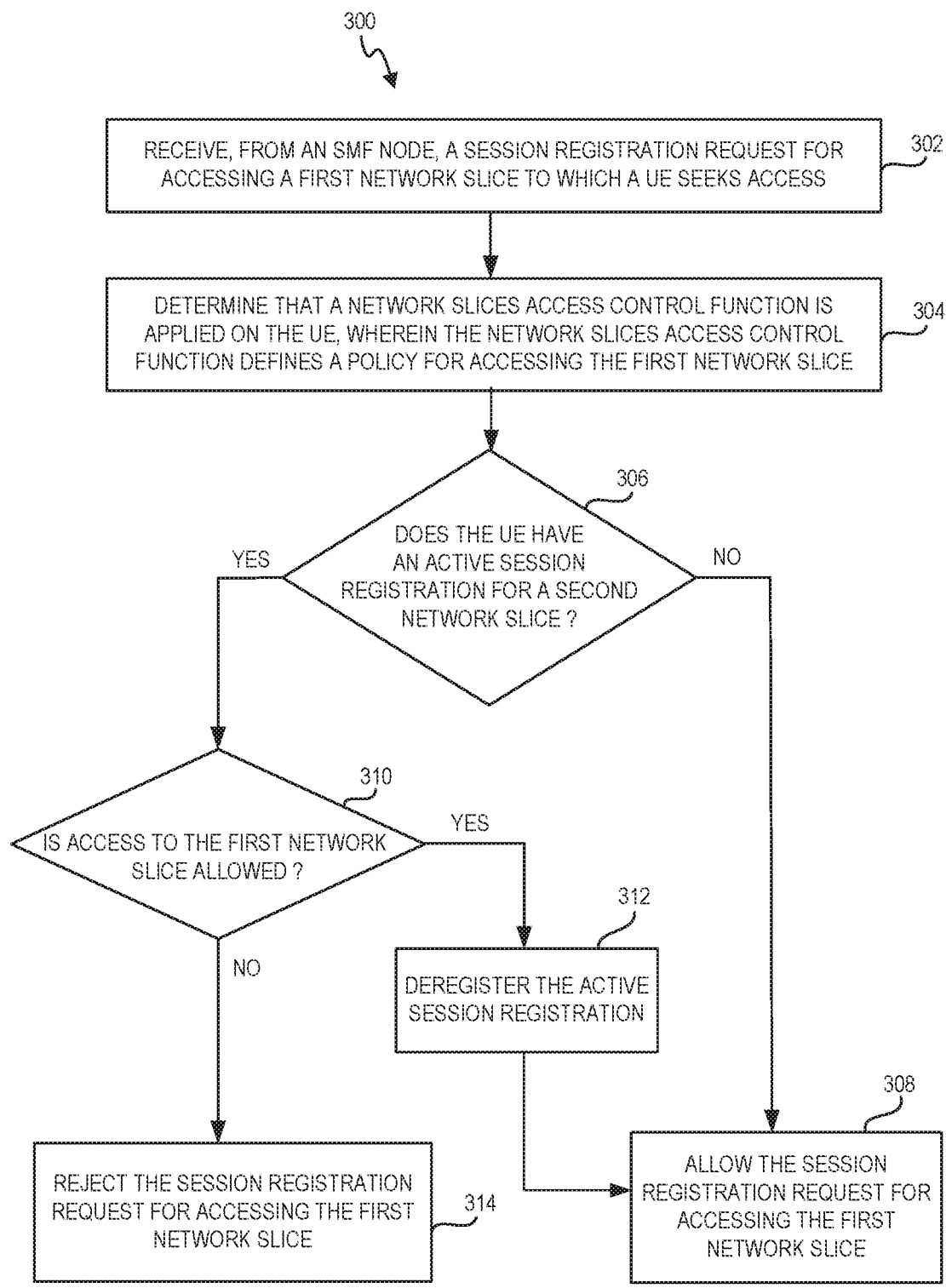
FIG. 3 is a flowchart of a method for managing mutually exclusive access to network slices for a UE in a communications network, in accordance with another example.

FIGS. 2 and 3 depict flowcharts of example methods 200 and 300 for managing the mutually exclusive access to network slices in the network environment 100. In particular, FIGS. 2 and 3 depict the flowcharts of the example methods 200 and 300 for determining whether a UE (e.g., the UE 106-1) can access a given network slice (e.g., the first network slice) when a session registration request (e.g., the first SMF session registration request) for accessing the first network slice is received by the UDM node 132 from the SMF node 122. Although the example methods 200 and 300 of FIGS. 2 and 3, individually, show a specific order of performing certain functionalities, the methods are not limited to such order. For example, the functionalities shown in succession in the flowcharts may be performed in a different order, may be executed concurrently, or with partial concurrence or combinations thereof.

In FIG. 2, a flowchart depicting the example method 200 for managing the mutually exclusive access to network slices in the network environment 100 is presented, in accordance with an example. In an example, the example method 200 may be performed by the UDM node 132, in particular, by the processing resource 134 of the UDM node 132.

At block 202, the UDM node 132 may receive the first SMF session registration request from the selected SMF node 122. The first SMF session registration request may correspond to the first PDU session establishment request of the UE 106-1 to access the first network slice, as described above.

At block 204, the UDM node 132 may determine that the network slices access-control function 133 is applied on the UE 106-1. In an example, the UDM node 132 may retrieve the subscription data for the UE 106-1 from the UDR 140 and determine from the retrieved subscription data that the network slices access-control function 133 is applied on the UE 106-1.

At block 206, the UDM node 132 may perform a check to determine whether the UE 106-1 has an active session registration for a second network slice. The active session registration may refer to an SMF session registration (e.g., a second SMF session registration) to access a second network slice, that is in use at the time of receiving the first SMF session registration request. In an example, the UE 106-1 may be accessing the second network slice at the time of receiving, by the UDM node 132, the first SMF registration request. In some examples, the UDM node 132 may have registered the second SMF session registration after verifying that the UE 106-1 can access the second network slice based on the mutually exclusive access policy 136.

In order to determine whether the UE 106-1 has the active session registration, the UDM node 132 may retrieve the subscription data from the UDR 140 for the UE 106-1 and determine whether the subscription data may include information related to any active session registration. In some examples, the absence of any active session registration in the subscription data may indicate that the UE 106-1 is not connected to the second network slice. In some examples, the presence of any active session registration in the subscription data may indicate that the UE 106-1 has the active session registration for the second network slice and is connected to the second network slice.

In this manner, at block 206, if it is determined that the UE 106-1 does not have any active session registration, the UDM node 132, at block 208, may allow the first SMF session registration request. In these examples, the UDM node 132 may perform a first SMF session registration corresponding to the first SMF session registration request and store information related to the first SMF session registration in the UDR 140.

At block 206, if it is determined that the UE 106-1 has the active session registration, the UDM node 132 may, at block 210, selectively reject the first SMF session registration request based on the mutually exclusive access policy 136. As used herein, the term "selectively rejecting" or "selectively reject" may mean that the UDM node 132 determines whether or not to reject the first SMF session registration request to access the first network slice based on the mutually exclusive access policy 136. In some examples, the UDM node 132 may determine whether access to the first network slice is allowed or restricted based on the mutually exclusive access policy 136 and accordingly may allow or reject the first SMF session registration.

Turning to FIG. 3, a flowchart depicting the example method 300 for managing the mutually exclusive access to network slices in the network environment 100 is presented, in accordance with another example. In an example, the example method 300 may be performed by the UDM node 132, in particular, by the processing resource 134 of the UDM node 132. The example method 300 of FIG. 3 includes certain method blocks that are similar to one or more method blocks described in FIG. 2, details of which are not repeated herein for the sake of brevity. By way of example, the blocks 302, 304, 306, and 308 of FIG. 3 are respectively similar to blocks 202, 204, 206, and 208 of FIG. 2.

At block 302, the UDM node 132 may receive the first SMF session registration request from the SMF node 122. At block 304, the UDM node 132 may determine that the network slices access-control function 133 is applied on the UE 106-1. At block 306, the UDM node 132 may perform a check to determine whether the UE 106-1 has the active session registration for the second network slice. At block 306, if it is determined that the UE 106-1 does not have any active session registration, the UDM node 132 may, at block 308, allow the first SMF session registration request.

At block 306, if it is determined that the UE 106-1 has the active session registration for the second network slice, the UDM node 132 may, at block 310, perform a check to determine whether access to the first network slice is allowed based on the mutually exclusive policy 136. In order to determine whether access to the first network slice is allowed, the UDM node 132 may apply the mutually exclusive access policy 136. In some examples, the UDM node 132 may apply at least the first policy, the second policy, or the third policy of the mutually exclusive access policy 136.

In this manner, at block 310, if it is determined that access to the first network slice is allowed, the UDM node 132, at block 312, may deregister the active session registration for the second network slice to disconnect the second network slice for the UE 106-1. The method 300 may then proceed to block 308. At block 308, the UDM node 132 may allow the first session registration request after deregistering the active session registration.

Referring to block 310 again, at block 310, if it is determined that access to the first network slice is not allowed, the UDM node 132, at block 314, may reject the first SMF session registration request.

Figure 4:
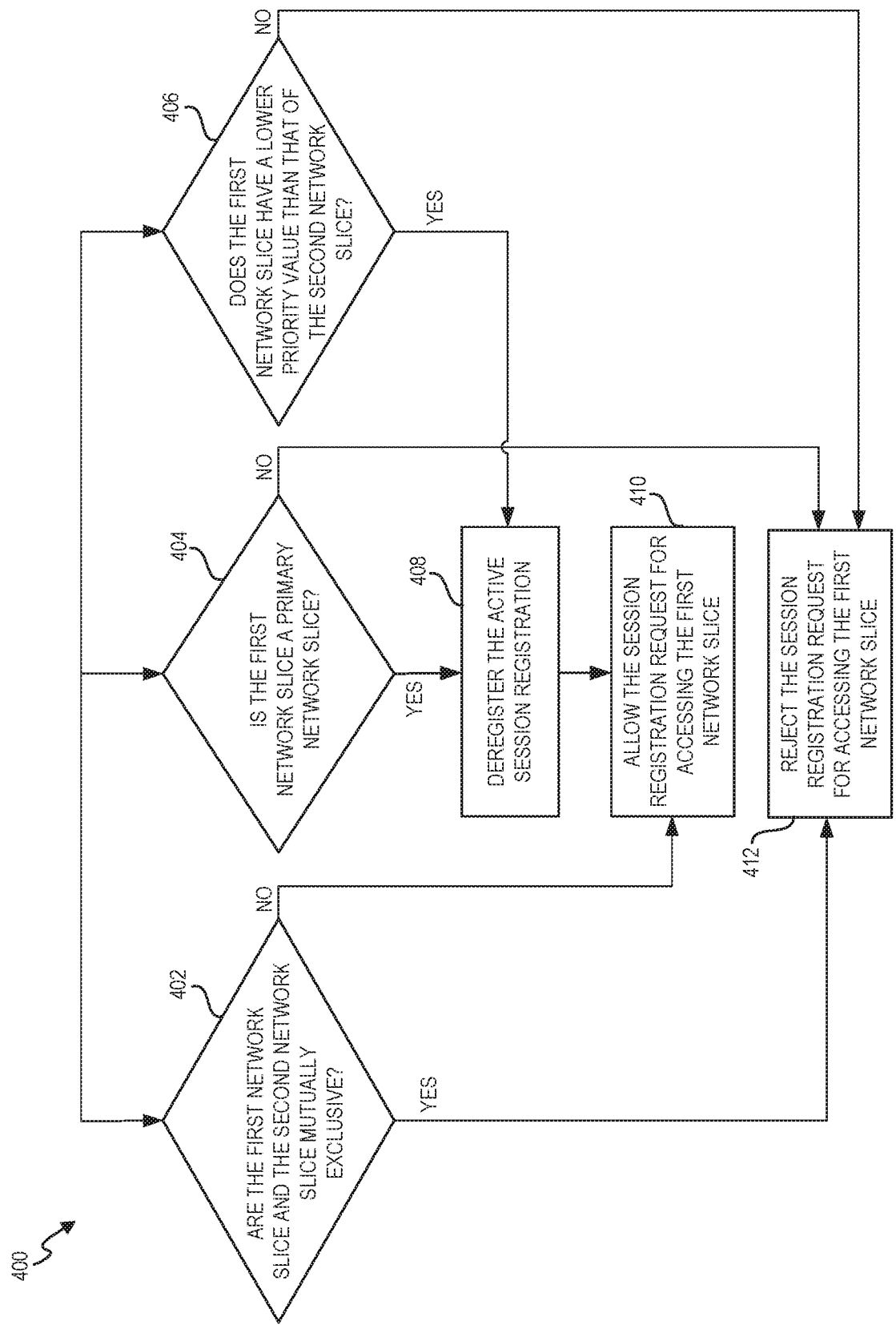
FIG. 4 is a flowchart of a method for determining whether a session registration request for accessing a first network slice, for a UE, in a communications network is allowed or rejected, in accordance with one example.

Referring to FIG. 4, a flowchart depicting the example method 400 for determining whether access to the first network slice is allowed or restricted is presented, in some examples. The example method 400 of FIG. 4 depicts certain method blocks after performing the method block 306 of FIG. 3 and in response to determining that the UE 106-1 has the active session registration for the second network slice, in some examples. In an example, the example method 400 may be performed by the UDM node 132, in particular, by the processing resource 134 of the UDM node 132. The example method 400 of FIG. 4 includes certain method blocks that are similar to one or more method blocks described in FIG. 3, details of which are not repeated herein for the sake of brevity. By way of example, blocks 406, 410, and 412 of FIG. 4 are respectively similar to blocks 312, 308, and 314 of FIG. 3.

In some examples, the UDM node 132 may determine whether access to the first network slice is allowed or restricted based on the first policy of the mutually exclusive access policy 136. At block 402, the UDM node 132 may perform a check to determine whether the first network slice and the second network slice are mutually exclusive based on the first policy (e.g., Table 1). At block 402, if it is determined that the first network slice and the second network slice are mutually exclusive, the UDM node 132 may determine that access to the first network slice is not allowed. The method 400, then proceed to block 412. At block 412, the UDM node 132 may reject the first SMF session registration request for accessing the first network slice.

Referring again to block 402, if it is determined that the first network slice and the second network slice are not mutually exclusive, the UDM node 132 may determine that access to the first network slice is allowed. The method 400 may then proceed to block 410. At block 410, the UDM node 132 may allow the first SMF session registration request for accessing the first network slice.

In some examples, the UDM node 132 may determine whether access to the first network slice is allowed or restricted based on the second policy of the mutually exclusive access policy 136. At block 404, the UDM node 132 may perform a check to determine whether the first network slice is a primary network slice at a point in time based on the second policy (e.g., Table 2). At block 404, if it is determined that the first network slice is the primary network slice at that point in time, the UDM node 132 may determine that access to the first network slice is allowed. In some examples, if the second network slice and the second network slice are mutually exclusive, the UDM node 132, at block 408, may deregister the active session registration to disconnect the second network slice for the UE 106-1 and proceed to block 410. At block 410, the UDM node 132 may allow the first SMF session registration request for accessing the first network slice after deregistering the active session registration.

Referring to block 404 again, if it is determined that the first network slice is not the primary network slice at that point in time, the UDM node 132 may determine that access to the first network slice is not allowed. The method 400 may then proceed to block 412. At block 412, the UDM node 132 may reject the first SMF session registration request for accessing the first network slice.

In some examples, the UDM node 132 may determine whether access to the first network slice is allowed or restricted based on the third policy of the mutually exclusive access policy 136. At block 406, the UDM node 132 may perform a check to determine whether the first network slice has a priority value lower than a priority value of the second network slice based on the third policy (e.g., Table 3). At block 406, if it is determined that the first network slice has the priority value lower than the priority value of the second network slice, the UDM node 132 may determine that access to the first network slice is allowed. The method 400 may then proceed to block 408. At block 408, the UDM node 132 may deregister the active session registration to disconnect the second network slice for the UE 106-1 and, at block 410, allow the first SMF session registration request for accessing the first network slice after deregistering the active session registration.

Referring to 406 again, if it is determined that the first network slice has the priority value higher than the priority value of the second network slice, the UDM node 132 may determine that access to the first network slice is not allowed. The method 400 may then proceed to block 412. At block 412, the UDM node 132 may reject the first SMF session registration request for accessing the first network slice.

As described, if the UDM node 132 determines that access to the first network slice is allowed based on the mutually exclusive access policy 136, the UDM node 132 may allow the first SMF session registration request. On the other hand, if the UDM node 132 determines that access to the first network slice is not allowed based on the mutually exclusive access policy 136, the UDM node 132 may reject the first SMF session registration request. In this manner, the UDM node 132 may selectively reject the first SMF session registration request based on the mutually exclusive access policy 136.

In some examples, when the UDM node 132 rejects the first SMF session registration request, the SMF node 122 may reject the first PDU session establishment request for accessing the first network slice. In other instances when the UDM node 132 allows the first SMF session registration request, the SMF node 122 may allow the first PDU session establishment request for accessing the first network slice.

In some examples, the UDM node 132 may determine whether access to the first network slice is allowed or restricted based on a combination of at least two of the first policy, the second policy, and the third policy.

Figure 5:
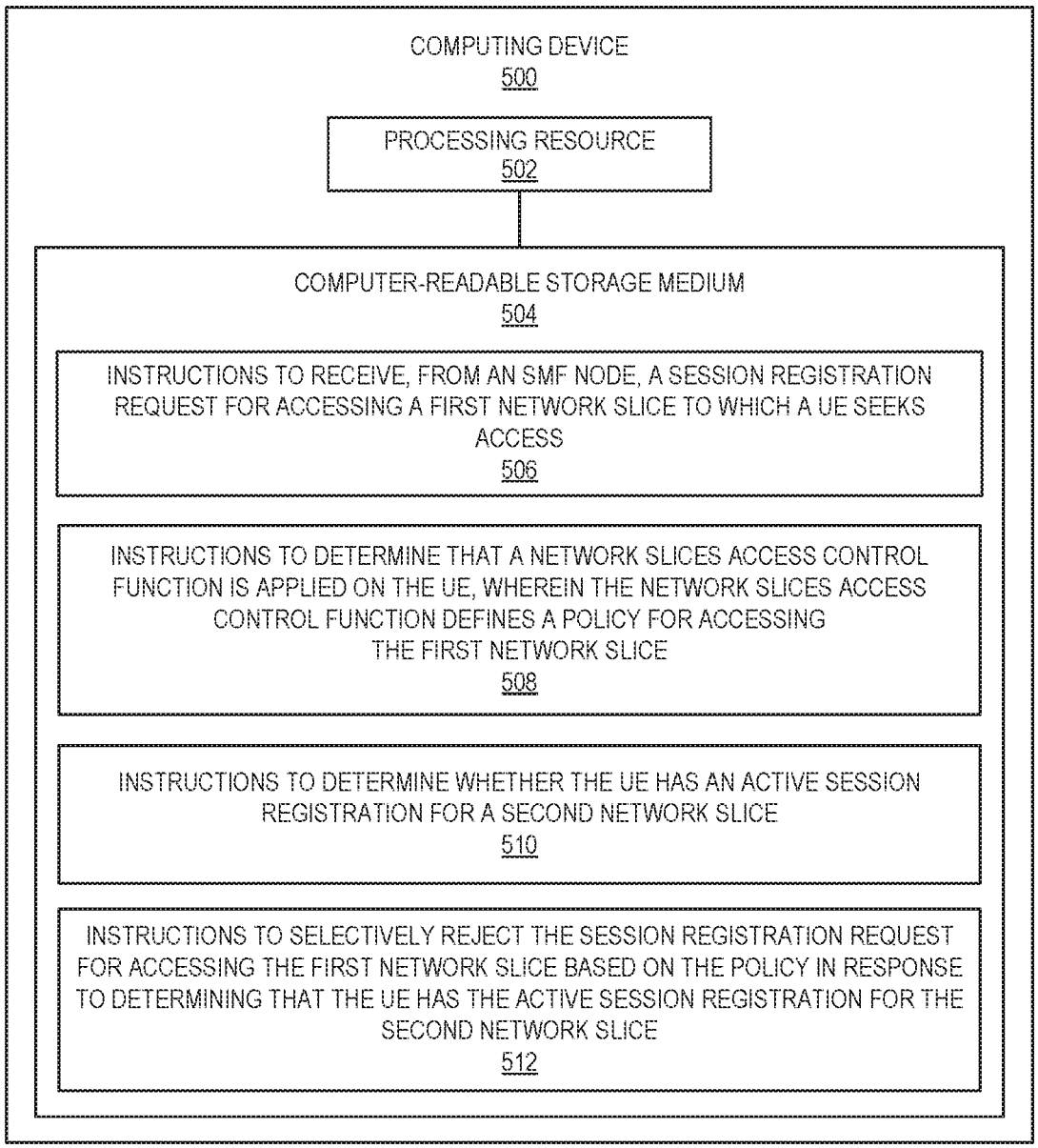
FIG. 5 is a block diagram of a UDM node comprising a processing resource and a computer-readable storage medium encoded with example instructions to manage mutually exclusive access to network slices for a UE, in accordance with an example.

FIG. 5 is a block diagram of a computing device 500 including a processing resource 502 and a computer-readable storage medium 504 encoded with example instructions for managing mutually exclusive access to network slices for a given UE (e.g., the UE 106-1 in FIG. 1) in a communications network (e.g., the network environment 100 of FIG. 1), in accordance with an example. The computer-readable storage medium 504 may be non-transitory and is alternatively referred to as a non-transitory computer-readable storage medium 504. As described in detail herein, the computer-readable storage medium 404 may be encoded with executable instructions 506, 508, 510, and 512 (hereinafter collectively referred to as instructions (506-512) for managing the mutually exclusive access to network slices for the UE 106-1.

In some examples, the computer-readable storage medium 504 may be accessed by the processing resource 502. In some examples, the computing device 500 may be included in (e.g., as part of) a UDM node (e.g., the UDM node 132 of FIG. 1). In some examples, the processing resource 502 may represent one example of the processing resource 134 of the UDM node 132. Further, the computer-readable storage medium 504 may represent one example of the computer-readable storage medium 135 of the UDM node 132. In some examples, the processing resource 502 may fetch, decode, and execute the instructions 506-512 stored in the computer-readable storage medium 504 for performing one or more of the method blocks of the example method 200 of FIG. 2. Although not shown, in some examples, the computer-readable storage medium 504 may be encoded with certain additional executable instructions to perform one or more of the method blocks of the example method 300 of FIG. 3 and/or example method 400 of FIG. 4, and/or any other operations performed by the UDM node 132, without limiting the scope of the present disclosure.

The instructions 506 when executed by the processing resource 502 may cause the processing resource 502 to receive the first SMF session registration request, from the selected SMF node 122, corresponding to the first PDU session establishment request to access the first network slice for the UE 106-1. Further, the instructions 508 when executed by the processing resource 502 may cause the processing resource 502 to determine that the network slices access-control function 133 is applied on the UE 106-1 in response to receiving the first SMF session registration request from the SMF node 122. Furthermore, the instructions 510 when executed by the processing resource 502 may cause the processing resource 502 to determine whether the UE 106-1 has an active session registration for a second network slice in response to determining that the network slices access-control function 133 is applied on the UE 106-1. In some examples, the UDM node 132 may determine that the UE 106-1 has the active session registration for the second network slice. Moreover, the instructions 512 when executed by the processing resource 502 may cause the processing resource 502 to selectively reject the first SMF session registration request based on the mutually exclusive access policy 136 in response to determining that the UE 106-1 has the active session registration for the second network slice.

In the examples described herein, functionalities described as being performed by "instructions" may be understood as functionalities that may be performed by those instructions when executed by a processing resource. In other examples, functionalities described in relation to instructions may be implemented by one or more modules, which may be any combination of hardware and programming to implement the functionalities of the module(s).

The foregoing description of various examples has been presented for purposes of illustration and description. The foregoing description is not intended to be exhaustive or limiting to the examples disclosed, and modifications and variations are possible in light of the above teachings or may be acquired from the practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, modules, systems, and computer program products except combinations where at least some of such features are mutually exclusive.

We claim:

1. A method, comprising:
  receiving, by a unified data management (UDM) node implementing UDM network function from a session management function (SMF) node, a session registration request for accessing a first network slice of a communications network to which a user equipment (UE) seeks access;
  determining, by the UDM node, that a network slice access-control function is applied on the UE;
  in response to determining that the network slice access-control function is applied on the UE, determining, by the UDM node, whether the UE has an active session registration for a second network slice in the communications network; and
  in response to determining that the UE has the active session registration for the second network slice, selectively rejecting, by the UDM node, the session registration request based on a combination of a first network slice access-control policy and a second network slice access-control policy, wherein the first network slice access-control policy specifies restricted network slices corresponding to one or more network slices, wherein the second network slice access-control policy specifies different primary network slices for different time periods, and wherein selectively rejecting the session registration request comprises:
    in response to determining that the first network slice and the second network slice are mutually exclusive based on the first network-slice-access-control policy, determining, by the UDM node, whether the first network slice is a primary network slice based on the second network slice access-control policy and an instant time; and
    in response to determining that the first network slice is the primary network slice, deregistering the active session registration for the second network slice and allowing the session registration request after deregistering the active session registration.

2. The method of claim 1, wherein the session registration request corresponds to a Protocol Data Unit (PDU) session registration request, from the UE, for accessing the first network slice.

3. The method of claim 1, further comprising:
  in response to determining that the first network slice and the second network slice are not mutually exclusive based on the first-network slice access-control policy, allowing the session registration request.

4. The method of claim 1, wherein the session registration request is rejected in response to determining that the first network slice is not the primary network slice.

5. The method of claim 1, further comprising:
  in response to determining that the UE has the active session registration for the second network slice, selectively rejecting, by the UDM node, the session registration request based on a combination of the first network slice access-control policy, the second network slice access-control policy, and a third network slice access-control policy, wherein the third network slice access-control policy specifies priority values associated with one or more network slices, and wherein selectively rejecting the session registration request comprises:
    in response to determining that the first network slice and the second network slice are mutually exclusive based on the first and second network slice access-control policies, determining, by the UDM node, whether the first network slice has a priority value lower than a priority value of the second network slice based on the third network slice access-control;
    in response to determining that the first network slice has the priority value lower than the priority value of the second network slice, deregistering, by the UDM node, the active session registration for the second network slice; and allowing, by the UDM node, the session registration request after deregistering the active session registration.

6. The method of claim 5, wherein the session registration request is rejected in response to determining that the first network slice does not have the priority value lower than the priority value of the second network slice.

7. A unified data management (UDM) node implementing a UDM network function in a communications network, comprising:
a processing resource; and
a computer-readable storage medium comprising instructions executable by the processing resource to:
receive, from a session management function (SMF) node, a session registration request for accessing a first network slice of the communications network to which a user equipment (UE) seeks access;
determine that a network slice access-control function is applied on the UE;
in response to determining that the network slice access-control function is applied on the UE, determine whether the UE has an active session registration for a second network slice in the communications network; and
in response to determining that the UE has the active session registration for the second network slice, selectively reject the session registration request for accessing the first network slice based on a combination of a first network slice access-control policy and a second network slice access-control policy, wherein the first network slice access-control policy specifies restricted network slices corresponding to one or more network slices, wherein the second network slice access-control policy specifies different primary network slices for different time periods, and wherein selectively rejecting the session registration request comprises:
in response to determining that the first network slice and the second network slice are mutually exclusive based on the first network slice access-control policy, determining whether the first network slice is a primary network slice based on the second network slice access-control policy and an instant time; and
in response to determining that the first network slice is the primary network slice, deregistering the active session registration for the second network slice and allowing the session registration request after deregistering the active session registration.

8. The UDM node of claim 7, wherein the session registration request corresponds to a Protocol Data Unit (PDU) session registration request, from the UE, for accessing the first network slice.

9. The UDM node of claim 8, wherein the instructions comprise instructions executable by the processing resource to:
in response to determining that the UE has the active session registration for the second network slice, selectively reject the session registration request based on a combination of the first network slice access-control policy, the second network slice access-control policy, and a third network slice access-control policy, wherein the third network slice access-control policy specifies priority values associated with one or more network slices, and wherein selectively rejecting the session registration request comprises:
in response to determining that the first network slice and the second network slice are mutually exclusive based on the first and second network slice access-control policies, determine whether the first network slice has a priority value lower than a priority value of the second network slice based on the third network slice access-control policy;
deregister the active session registration for the second network slice in response to determining that the first network slice has the priority value lower than the priority value of the second network slice; and
allow the session registration request for accessing the first network slice after deregistering the active session registration.

10. The UDM node of claim 9, wherein the instructions comprise instructions executable by the processing resource to:
reject the session registration request in response to determining that the first network slice does not have the priority value lower than the priority value of the second network slice.

11. The UDM node of claim 7, wherein the instructions comprise instructions executable by the processing resource to allow the session registration request in response to determining that the first network slice and the second network slice are mutually exclusive based on the first network slice access-control policy.

12. The UDM node of claim 7, wherein the instructions comprise instructions executable by the processing resource to:
reject the session registration request in response to determining that the first network slice is not the primary network slice.

13. A non-transitory computer-readable storage medium comprising instructions executable by a processing resource of a unified data management (UDM) node implementing a UDM network function in a communications network, to:
receive, from a session management function (SMF) node, a session registration request for accessing a first network slice of a communications network to which a user equipment (UE) seeks access;
determine that a network slice access-control function is applied on the UE;
in response to determining that the network slice access-control function is applied on the UE, determine whether the UE has an active session registration for a second network slice in the communications network; and
in response to determining that the UE has the active session registration for the second network slice, determine whether the session registration request for accessing the first network slice is allowed based on a combination of a first network slice access-control policy and a second network slice access-control policy, wherein the first network slice access-control policy specifies restricted network slices corresponding to one or more network slices, wherein the second network slice access-control policy specifies different primary network slices for different time periods, and wherein determining whether the session registration request for accessing the first network slice is allowed comprises:
in response to determining that the first network slice and the second network slice are mutually exclusive based on the first network slice access-control policy, determining, by the UDM node, whether the first network slice is a primary network slice based on the second network slice access-control policy and an instant time;

in response to determining that the first network slice is the primary network slice, determining that the session registration request is allowed; and in response to determining that the first network slice is not the primary network slice, determining that the session registration request is not allowed.

14. The non-transitory computer-readable storage medium of claim 13, wherein the instructions comprise instructions executable by the processing resource to:

in response to determining that the UE has the active session registration for the second network slice, determine whether the session registration request for accessing the first network slice is allowed based on a combination of the first network slice access-control policy, the second network slice access-control policy, and a third network slice access-control policy, wherein the third network slice access-control policy specifies priority values associated with one or more network slices, and wherein determining whether the session registration request for accessing the first network slice is allowed comprises:

in response to determining that the first network slice and the second network slice are mutually exclusive based on the first and second network slice access-control policies, determine whether the first network slice has a priority value lower than a priority value of the second network slice based on the third network slice access-control policy;

in response to determining that the first network slice has the priority value lower than the priority value of the second network slice, determining that the session registration request is allowed; and in response to determining that the first network slice does not have the priority value lower than the priority value of the second network slice, determining that the session registration request is not allowed.

* * * * *